United States Patent
DeLuca

(10) Patent No.: US 11,030,506 B2
(45) Date of Patent: Jun. 8, 2021

(54) MULTI-TAG ENCODING FOR REDUCING TAG TAMPERING IN INSTANT CHECKOUT

(71) Applicant: INTERNATIONAL BUSINESS MACHINES CORPORATION, Armonk, NY (US)

(72) Inventor: Lisa Seacat DeLuca, Baltimore, MD (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/575,832

(22) Filed: Sep. 19, 2019

(65) Prior Publication Data
US 2021/0089857 A1 Mar. 25, 2021

(51) Int. Cl.
G06K 19/073 (2006.01)
G06K 7/10 (2006.01)
G06K 19/06 (2006.01)

(52) U.S. Cl.
CPC ... G06K 19/07372 (2013.01); G06K 7/10366 (2013.01); G06K 19/06037 (2013.01)

(58) Field of Classification Search
CPC .............................................. G06K 19/07372
USPC ....................................................... 235/451
See application file for complete search history.

(56) References Cited

U.S. PATENT DOCUMENTS

| | | | |
|---|---|---|---|
| 9,652,709 B2 | 5/2017 | Downie et al. | |
| 9,697,711 B2 | 7/2017 | McIntosh | |
| 10,140,486 B1 | 11/2018 | Lavery et al. | |
| 10,169,969 B2 | 1/2019 | Tam | |
| 10,234,550 B2 | 3/2019 | Khojastepour et al. | |
| 10,248,817 B2 | 4/2019 | Zumsteg et al. | |
| 2003/0195644 A1* | 10/2003 | Borders | A61G 13/107 700/90 |
| 2007/0008121 A1 | 1/2007 | Hart | |
| 2008/0198011 A1 | 8/2008 | Leper | |
| 2010/0148934 A1* | 6/2010 | Nasser | 340/10.4 |
| 2014/0062761 A1 | 3/2014 | Youn et al. | |
| 2014/0327541 A1* | 11/2014 | Ani | G01S 19/16 340/539.13 |
| 2016/0116565 A1 | 4/2016 | Sanders et al. | |

(Continued)

OTHER PUBLICATIONS

Bolotnyy, et al., "Multi-Tag RFID Systems", Copyright 2007, Int. J. Internet Protocol Technology, vol. 2, Nos. 3/4, 2007, Interscience Enterprises Ltd.,.

(Continued)

*Primary Examiner* — Allyson N Trail
(74) *Attorney, Agent, or Firm* — Steven M. Bouknight

(57) ABSTRACT

A method for detecting tag tampering on an item located in a venue is provided. The method may include registering a first tag and a second tag with the item, wherein the first tag and the second tag are located on the item. The method may further include pairing the first tag and the second tag that are registered with the item. The method may further include, determining and registering a distance between the first tag and the second tag on the item. The method may further include detecting whether tag tampering occurs on the item, whereby detecting whether tag tampering occurs comprises detecting whether the first tag and the second tag are displaced from the registered distance between the first tag and the second tag associated with the item.

20 Claims, 6 Drawing Sheets

(56) References Cited

U.S. PATENT DOCUMENTS

| | | | | |
|---|---|---|---|---|
| 2017/0004335 | A1* | 1/2017 | Russell | G06K 7/10128 |
| 2017/0017814 | A1 | 1/2017 | Roberts | |
| 2017/0277551 | A1 | 9/2017 | Nicholson | |
| 2018/0165564 | A1 | 6/2018 | Springer et al. | |
| 2018/0293534 | A1* | 11/2018 | Tiwari et al. | G06Q 10/0875 |
| 2019/0016360 | A1 | 1/2019 | Jones et al. | |
| 2019/0385038 | A1* | 12/2019 | Tehranipoor et al. | |
| | | | | G06K 19/077 |

OTHER PUBLICATIONS

Dhal, et al., "Object Authentication Using RFID Technology: A Multi-Tag Approach", I. J. Computer Network and Information Security, 2015, 4, pp. 44-53, Published Online Mar. 2015 in MECS (http://www.mecs-press.org/), DOI: 10.5815/ijcnis.2015.04.06.

Han, et al., "Improving Accuracy for 3D RFID Localization", Hindawi Publishing Corporation, Received Dec. 15, 2011, Accepted Feb. 4, 2012, 9 pages, vol. 2012, Article ID 865184, Retrieved from the Internet: <https://journals.sagepub.com/doi/pdf/10.1155/2012/865184>.

Mell et al., "The NIST Definition of Cloud Computing", National Institute of Standards and Technology, Special Publication 800-145, Sep. 2011, 7 pages.

Patil, et al., "Tamper Detection Technique in RFID System", International Journal of Engineering Research and Applications (IJERA), Oct. 2015, 5 pages, ISSN: 2248-9622.

Quora, "Can the position of a RFID tag be tracked, with hgih precision, in a 2D or 3D space?", [accessed on Sep. 18, 2019], 3 pages, Retrieved from the Internet: <https://www.quora.com/Can-the-position-of-a-RFID-tag-be-tracked-with-high-precision-in-a-2D-or-3D-space>.

Screen capture from YouTube video clip entitled "Can technology help you live longer?", 1 page, uploaded on Jan. 31, 2018 by user "BBC Click", Retrieved from the Internet: ,https://www.youtube.com/watch?v=8HwOrFzHePA>.

Screen capture from YouTube video clip entitled "RFID as 3D Human-Computer Interface", 1 page, uploaded on Jun. 21, 2011 by user "lunantech", Retrieved from the Internet: <https://www.youtube.com/watch?v=juSJJq-9nEk>.

Shangguan, "Relative Localization Of RFID Tags Using Spatial-Temporal Phase Profiling", 12th USENIX Symposium on Networked Systems Design and Implementation (NSDI '15), May 4-6, 2015, Oakland, CA, USA, ISBN 978-1-931971-218.

Wu, "Three-Dimensional Indoor RFIS Localization System", University of Nebraska-Lincoln, Dec. 2012, 199 pages, Industrial and Management Systems Engineering—Dissertations and Student Research, Retrieved from the Internet: <https://digitalcommons.unl.edu/cgi/viewcontent.cgi?article=1039&context=imsediss>.

\* cited by examiner

MULTI-TAG ENCODING FOR REDUCING TAG TAMPERING IN INSTANT CHECKOUT

BACKGROUND

The present invention relates generally to the field of computing, and more specifically, to computer-implemented product security and theft prevention.

Generally, new and more prevalent ways of shopping at a store may not involve cashiers, registers, or checkout terminals. Specifically, store concepts such as Amazon Go® (Amazon Go and all Amazon Go-based trademarks and logos are trademarks or registered trademarks of Amazon Technologies, Inc. and/or its affiliates) and IBM Instant Checkout® (IBM Instant Checkout and all IBM Instant Checkout-based trademarks and logos are trademarks or registered trademarks of International Business Machines Corporation and/or its affiliates) may provide partly-automated shopping experiences, where customers are able to purchase products without being checked out by a cashier and without using a typical self-checkout station. Instead, by using a combination of technologies, these so-called smart stores may allow customers to purchase products by simply tracking the products that customers are picking up and exiting the store with to provide a seamless shopping experience.

SUMMARY

A method for detecting tag tampering on at least one item located in a venue is provided. The method may include registering a first tag and a second tag with the at least one item, wherein the first tag and the second tag are attached to or located on the at least one item. The method may further include pairing the first tag and the second tag that are registered with the at least one item. The method may further include, determining and registering a distance between the first tag and the second tag on the at least one item. The method may further include detecting whether tag tampering occurs on the at least one item, whereby detecting whether tag tampering occurs comprises detecting whether the first tag and the second tag are displaced from the registered distance between the first tag and the second tag associated with the at least one item.

A computer system for detecting tag tampering on at least one item located in a venue is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include registering a first tag and a second tag with the at least one item, wherein the first tag and the second tag are attached to or located on the at least one item. The method may further include pairing the first tag and the second tag that are registered with the at least one item. The method may further include, determining and registering a distance between the first tag and the second tag on the at least one item. The method may further include detecting whether tag tampering occurs on the at least one item, whereby detecting whether tag tampering occurs comprises detecting whether the first tag and the second tag are displaced from the registered distance between the first tag and the second tag associated with the at least one item.

A computer program product for detecting tag tampering on at least one item located in a venue is provided. The computer program product may include one or more computer-readable storage devices and program instructions stored on at least one of the one or more tangible storage devices, the program instructions executable by a processor. The computer program product may include program instructions to register a first tag and a second tag with the at least one item, wherein the first tag and the second tag are attached to or located on the at least one item. The computer program product may also include program instructions to pair the first tag and the second tag that are registered with the at least one item. The computer program product may further include program instructions to determine and register a distance between the first tag and the second tag on the at least one item. The computer program product may also include program instructions to detect whether tag tampering occurs on the at least one item, whereby detecting whether tag tampering occurs comprises detecting whether the first tag and the second tag are displaced from the registered distance between the first tag and the second tag associated with the at least one item.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
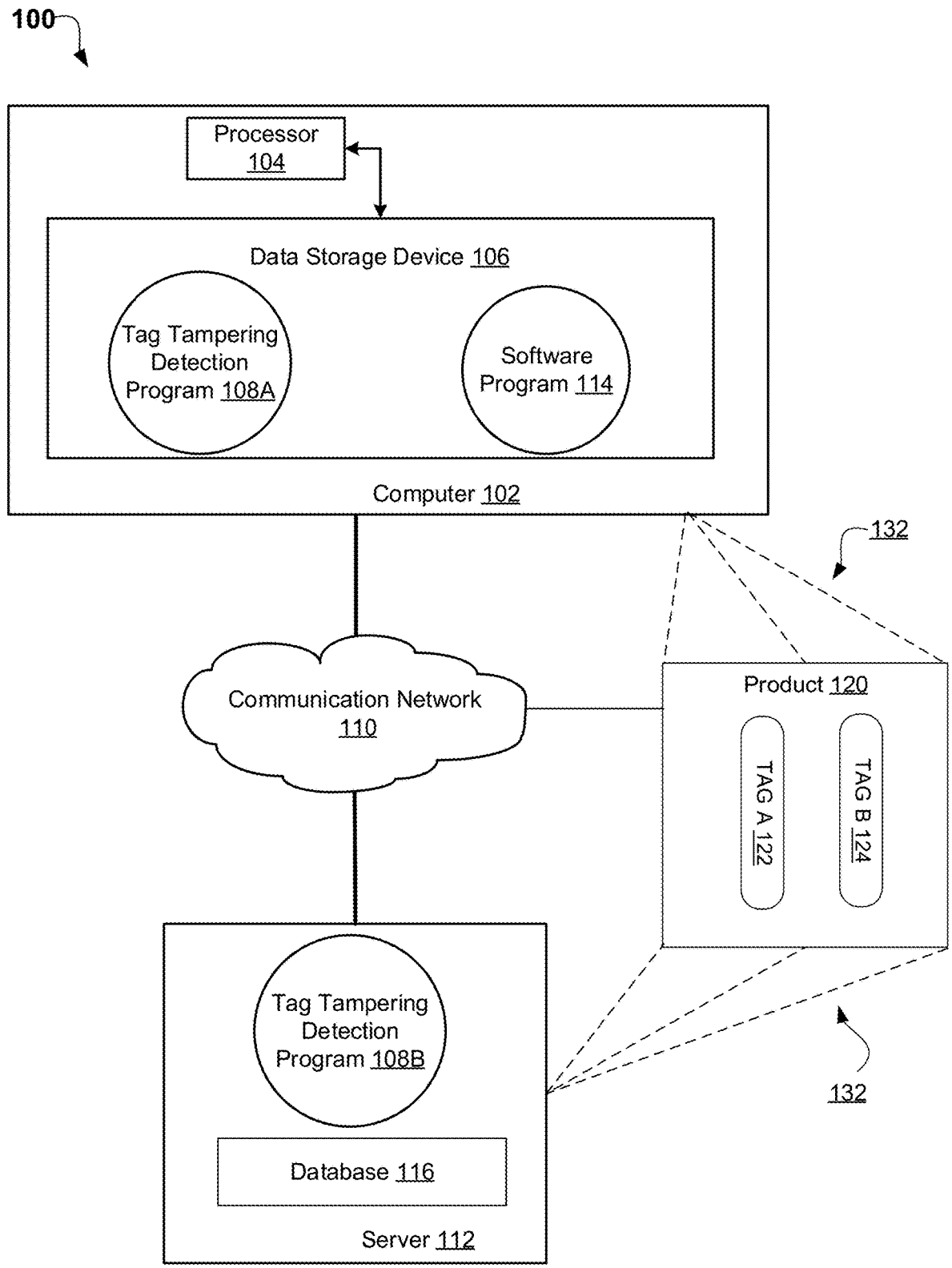
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

As previously described, embodiments of the present invention relate generally to the field of computing, and more particularly, to computer-implemented product security and theft prevention. The following described exemplary embodiments provide a system, method and program product for detecting tag tampering on a store product located at a store. Specifically, the present invention has the capacity to improve the technical fields associated with smart stores and product tags by detecting whether a customer has tampered with a tag, such as a radio-frequency identification (RFID) tag or Bluetooth sensor, on one or more products at a store in an attempt to steal the product. Specifically, based on a process of tagging a store product with multiple RFID tags, the present invention may reduce tag tampering by malicious shoppers. More specifically, the system, method and program product may detect tag tampering on a store product by tagging a product with multiple RFID tags, pairing and registering the multiple RIFD tags based in part on the relative position of each of the RFID tags on the product, and detecting whether at least one of the RFID tags is displaced from its relative position.

As previously described with respect to new ways of shopping, store concepts such as Amazon Go® and IBM Instant Checkout® may provide partly-automated shopping experiences, where customers are able to purchase products without being checked out by a cashier or using a typical self-checkout station. Instead, using a combination of technologies, stores may be able to track products that customers are picking up and purchasing to provide a frictionless shopping experience. Specifically, for example, store companies may tag products using RFID tags and then use RFID readers throughout a store venue to determine when an item is being purchased by a shopper. RFID technology uses electromagnetic fields to automatically identify and track RFID tags that are attached to objects or items purchased at the store. In some cases, the RFID tags may additionally include electronically stored information. However, despite such advancements in technology, there still is a concern that malicious shoppers will tamper with the RFID tags to engage in shoplifting or theft. Specifically, depending on the integration of an RFID tag with product packaging, a possibility may remain for a shopper to remove an RFID tag from a first product and place the RFID tag on a second product in an attempt to pay less for the second product, and/or remove the RFID tag completely to avoid paying for the product altogether. As such, it may be advantageous, among other things, to provide a method, computer system, and computer program product for detecting tag tampering in real-time to thereby dissuade malicious shoppers from shoplifting. Specifically, the method, computer system, and computer program product may detect tag tampering on a product by tagging a product with multiple RFID tags, pairing and registering the multiple RIFD tags based in part on the relative position of each of the RFID tags on the product, and detecting whether at least one of the RFID tags is displaced from its relative position.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, an exemplary networked computer environment 100 in accordance with one embodiment is depicted. The networked computer environment 100 may include a client computer 102 with a processor 104 and a data storage device 106 that is enabled to run a tag tampering detection program 108A and a software program 114. The client computer 102 may be a computer such as a mobile device (such as a mobile phone device and a tag reader), an RFID reader, a Bluetooth reader, tablet, laptop, desktop, camera, smart shelf, smart shopping cart, a checkout station, and/or any computing device that may also be capable reading tag information associated with an item located at a store. As such, the client computer 102 may also include a scanning mechanism (not shown), such as a camera and/or a tag reader, that may scan and detect a product 120 and the tags 122, 124 on the product as indicated by the dotted lines 132 in FIG. 1. The software program 114 may be an application program such as a store app, store database, web browser, and/or one or more apps running on the client computer 102. The tag tampering detection program 108A may communicate with the software program 114. The networked computer environment 100 may also include a server 112 that is enabled to run a tag tampering detection program 108B and the communication network 110. The networked computer environment 100 may include a plurality of computers 102 and servers 112, only one of which is shown for illustrative brevity. For example, the plurality of computers 102 and servers 112 may include a plurality of interconnected devices, such as mobile devices, cameras, and servers, that may be located throughout a store venue. According to at least one implementation, the present embodiment may also include a database 116, which may be running on server 112. Server 112 may also include a scanning mechanism (not shown) that may scan and detect a product 120 and the tags 122, 124 on the product as indicated by the dotted lines 132 in FIG. 1.

The communication network 110 may include various types of communication networks, such as a wide area network (WAN), local area network (LAN), a telecommunication network, a wireless network, a public switched network and/or a satellite network. The client computer 102 may communicate with server computer 112 via the communications network 110. The communications network 110 may include connections, such as wire, wireless communication links, or fiber optic cables. As will be discussed with reference to FIG. 3, server computer 112 may include internal components 800a and external components 900a, respectively, and client computer 102 may include internal components 800b and external components 900b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing device capable of running a program and accessing a network. According to various implementations of the present embodiment, the tag tampering detection program 108A, 108B may interact with a database 116 that may be embedded in various storage devices, such as, but not limited to, a mobile device 102, a networked server 112, or a cloud storage service.

According to the present embodiment, a program, such as a tag tampering detection program 108A and 108B may run on the client computer 102 and/or on the server computer 112 via a communications network 110. The tag tampering detection program 108A, 108B may detect tag 122, 124 tampering on a product 120 located at a store. Specifically, a client computer 102, such as a mobile computing device with RFID tag reading ability, may run a tag tampering detection program 108A, 108B that may interact with a software program 114, such as a store application, to detect tag tampering on a product 120 by detecting whether at least one of the RFID tags 122 that is associated with a pair of RFID tags 122, 124 is displaced from its relative position on the product 120 when compared to another RFID tag 124 associated with the pair 122, 124 and based on a registered position of the RFID tags. It may be appreciated that FIG. 1 provides only an illustration of one implementation and does not imply any limitations with regard to the environments in which different embodiments may be implemented. Many modifications to the depicted environments may be made based on design and implementation requirements.

Figure 2:
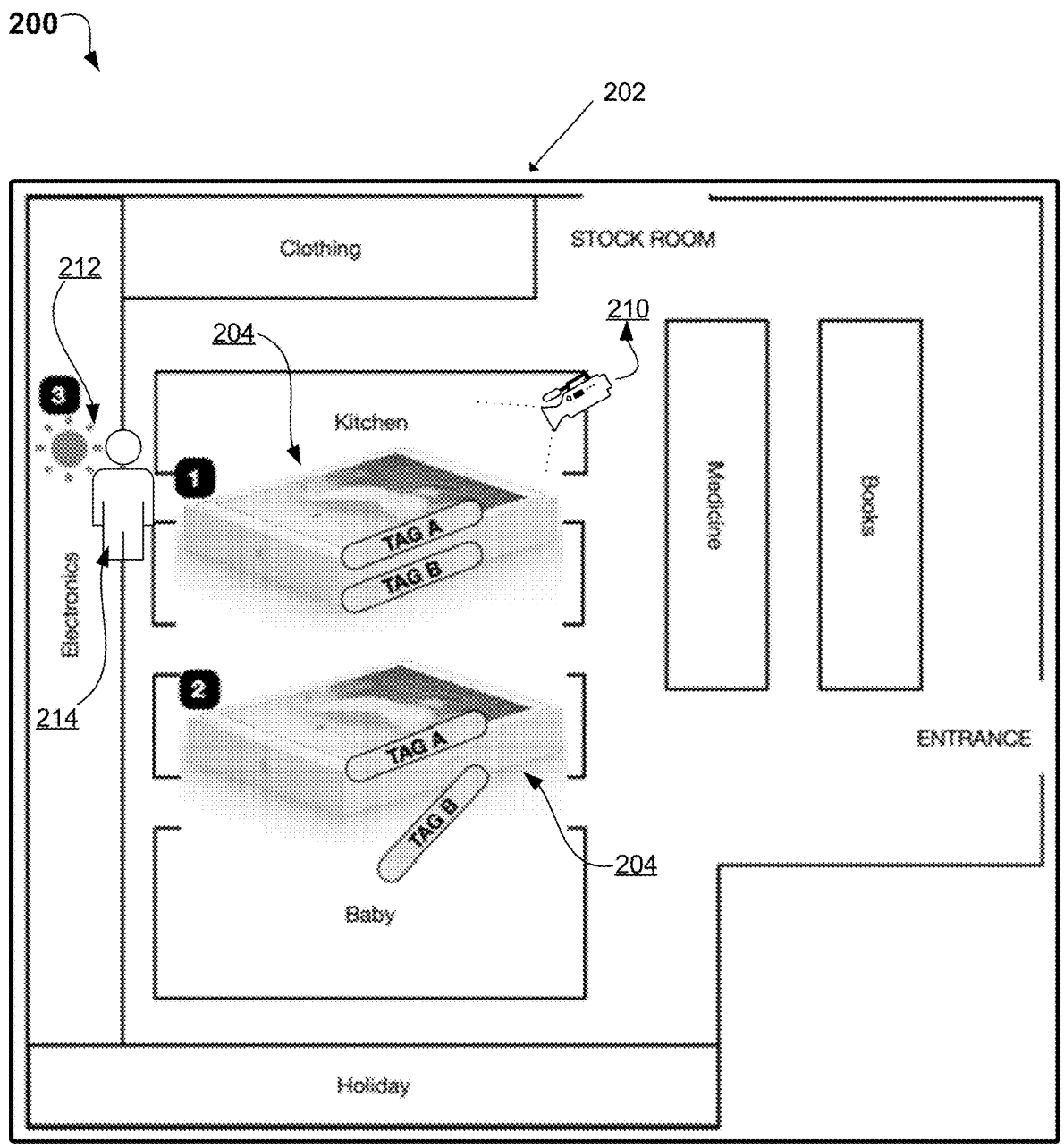
FIG. 2 is a visual representation of an embodiment of a tag tampering detection program according to one embodiment.

Referring now to FIG. 2, a visual representation of an embodiment 200 of the present invention is depicted. Specifically, according one embodiment, the tag tampering detection program 108A, 108B may be embodied in one or more computer devices 102 (FIG. 1) and/or servers 112 that are located throughout a store venue 202. For example, and as previously described in FIG. 1, client computer 102 may be a mobile device (such as a mobile phone and/or RFID reader), tablet, laptop, desktop, camera, smart shelf, smart shopping cart, a checkout station and/or any computing device with tag reading capability and that is located at a store venue 202. As previously described, the tag tampering program 108A, 108B may detect whether a customer tampers with or removes one or more of the tags (i.e. RFID tags) on an item 204 in the store venue 202. Specifically, in an example scenario, a customer may be shopping in the store venue 202 and want to purchase an item 204. The item 204 may include at least two tags, Tag A and Tag B, as depicted in FIG. 2. According to one embodiment, the tag tampering detection program 108A, 108B may register that Tag A and Tag B are specifically attached to the item 204. Furthermore, based on the attachment of Tag A and Tag B to item 204, the tag tampering detection program 108A, 108B may also pair Tag A and Tag B and register the distance between Tag A and Tag B on the item 204. The tag tampering detection program 108A, 108B may also register additional information regarding the relationship between Tag A, Tag B, and the item 204, such as registering the weight of the item 204 and associating the weight of the item 204 with the Tag A and the Tag B.

Continuing the example scenario, the customer may pick up the item 204 for purchasing. However, the customer may want to pay less for the item 204 than the price that is indicated on the item 204. Therefore, the customer may locate a less expensive item (not shown) and remove a tag from the less expensive item. The customer may also remove the Tag B on the item 204 and place the tag that is removed from the less expensive item on the item 204 in place of the Tag B in an attempt to pay less for the item 204. The customer may also remove the Tag A from the item 204 as well as place the Tag A and Tag B on the less expensive item or discard Tag A and Tag B altogether. As such, in response to the customer removing the tag from the less expensive item and/or removing the Tag B from the item 204, the tag tampering detection program 108A, 108B that may be embodied in a nearby client device 102 (FIG. 1) and/or server 112 (FIG. 1) may detect that tag tampering has occurred. For example, the client device 102 (FIG. 1) may be a smart shelf and/or a camera 210 located in between shelves and/or located atop the store venue 202. The tag tampering detection program 108A, 108B may use the smart shelf and/or camera 210, and/or use an RFID reader and/or a Bluetooth reader associated with the smart shelf and/or camera, to scan the item 204. Specifically, according to one embodiment, the tag tampering detection program 108A, 108B may scan the item 204 and detect that tag tampering has occurred by detecting that Tag B is not within the registered distance of Tag A on the item 204. More specifically, and as previously described, the tag tampering detection program 108A, 108B may register that Tag A and Tag B are specifically attached to the item 204, register that Tag A and Tag B are a pair, and register the distance between Tag A and Tag B on the item 204. Therefore, in response to a customer removing Tag B from the item 204, the tag tampering detection program 108A, 108B may determine that the distance between Tag A and Tag B that is based on the customer removing the Tag B from the item 204 does not match the registered distance between Tag A and Tag B, and/or that Tag B has surpassed a threshold distance with respect to the registered distance (for example, Tag B has surpassed a certain allowable distance from Tag A). The tag tampering detection program 108A, 108B may similarly detect that tag tampering has occurred based on a discrepancy in the distance between the tags on the less expensive item in the same way it is detected on item 204.

The tag tampering detection program 108A, 108B may also detect that tag tampering has occurred based on the additional information associated with Tag A, Tag B, and the item 204. As previously described, the tag tampering detection program 108A, 108B may register additional information regarding the relationship between Tag A, Tag B, and the item 204, such as registering the weight of the item 204 and associating the weight of the item 204 with the Tag A and the Tag B. Thus, in response to the customer removing Tag A and Tag B from item 204 and placing them on the less expensive item, and/or in response to the customer removing one or all of the tags from the less expensive item and placing them on item 204, the tag tampering detection program 108A, 108B may detect that tag tampering has occurred based on the weight of either the item 204 or the less expensive item not matching the registered weight that is associated with the tags that are attached to them. For example, the tag tampering detection program 108A, 108B may register that item 204 has a net weight of 10 pounds, and may associate that weight with the pair of tags, Tag A and the Tag B. The tag tampering detection program 108A, 108B may also register that the less expensive item has a weight of 3 pounds and associate that item weight with the tags on the less expensive item. Therefore, in response to the customer removing Tag A and Tag B from item 204 and placing them on the less expensive item, and/or in response to the customer removing one or all of the tags from the less expensive item and placing them on item 204, the tag tampering detection program 108A, 108B may detect that tag tampering has occurred based on the weight of the less expensive item (i.e. 3 pounds) not matching the weight associated with Tag A and Tag B (i.e. 10 pounds) and/or based on the weight of the item 204 (i.e. 10 pounds) not matching the weight associated with the less expensive item tags (i.e. 3 pounds). According to one embodiment, the tag tampering detection program 108A, 108B may use the registered distance between tags, the registered weight of items, or a combination of the registered distance between tags and the registered weight of items to determine whether tag tampering has occurred.

Based on the determination by the tag tampering detection program 108A, 108B that tag tampering has occurred, the tag tampering detection program 108A, 108B may present an alert to indicate that tag tampering has occurred. For example, in response to determining that tag tampering has occurred, the tag tampering detection program 108A, 108B may present an alert that may include using a camera 210 to take a picture of the customer suspected of tag tampering, sounding an alarm such as alarm 212, turning on a light in the aisle where the suspected tag tampering has occurred, and/or locking doors to the store venue 202 to prevent the suspected customer from escaping. The tag tampering detection program 108A, 108B may also send a message to store associates 214 located within the store venue 202, whereby the message may include product information associated with the items in question (such as item price and item weight) and tag data associated with the tags in question (such as the items registered with the tags, and the current location of each of the tags). The tag tampering detection program 108A, 108B may also determine where the tag tampering issue has occurred and, based on global positioning satellite (GPS) information, may alert a nearby store associate 214 that is closest to the suspected tampering location. According to one embodiment, the tag tampering detection program 108A, 108B may send the message and/or the alert to mobile devices that may be a part of the store associates 214 person (i.e. located on or attached to the store associate in some way).

Figure 3:
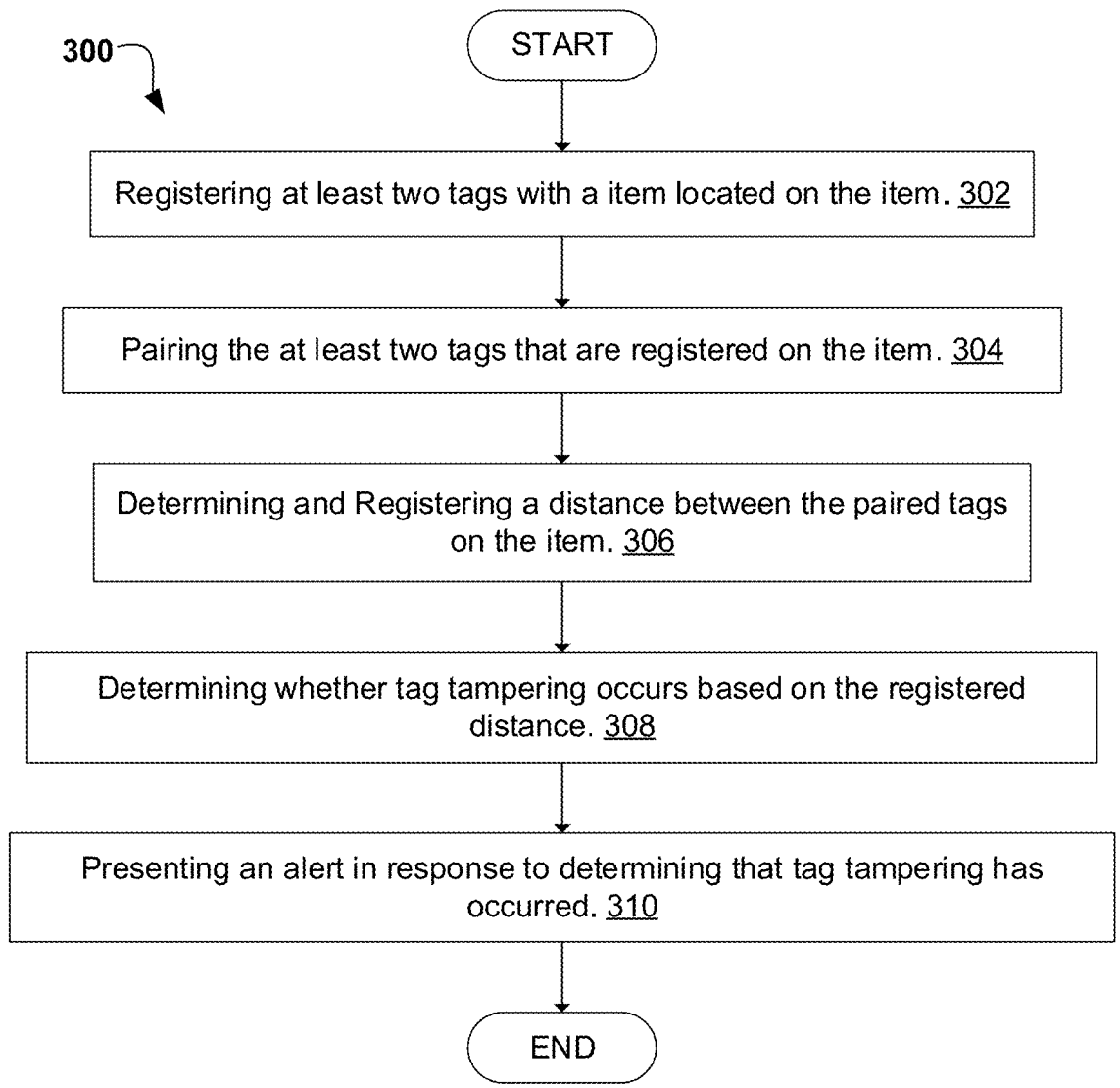
FIG. 3 is an operational flowchart illustrating steps carried out by a program for detecting tag tampering on at least one item located in a store venue according to one embodiment.

Referring now to FIG. 3, an operational flowchart illustrating the steps carried out by a program for detecting tag tampering on at least one item according to one embodiment is depicted. Specifically, at 302, the tag tampering detection program 108A, 108B may register at least two tags with an item 204 that are attached to or located on the item 204. For example, and as previously described in FIG. 2, the at least two tags may include RFID tags, Tag A and a Tag B (FIG. 2), that are attached to or located on an item 204 (FIG. 2). Therefore, the tag tampering detection program 108A, 108B may, for example, register on a data storage device 106 (FIG. 1) that is associated with a client device 102 (FIG. 1), and/or register on a database 116 (FIG. 1) that is associated with a server 112 (FIG. 1), that Tag A and Tag B are located on the item 204. Furthermore, according to one embodiment, the tag tampering detection program 108A, 108B may communicate with a software program 114 (FIG. 1), such as a store application, to communicate to the store application 114 (FIG. 1) that Tag A and Tag B are located on the item 204 (FIG. 2).

Next, at 304, the tag tampering detection program 108A, 108B may pair the at least two tags that are registered with the item 204 (FIG. 2). Specifically, based on the at least two tags (i.e. Tag A and Tag B) being located on and registered with the same item 204, the tag tampering detection program 108A, 108B may register that Tag A and Tag B are a pair, and thereby establish a paired relationship between Tag A and Tab B. More specifically, the paired relationship may establish that Tag A and Tag B are associated with each other and/or that Tag A and Tag B are grouped together or form a group of tags that are located on the item 204 (FIG. 2).

According to one embodiment, the tag tampering detection program 108A, 108B may pair Tag A and Tag B using the following pseudocode:
1. function pairTags (tagA, tagB) {
2. tagA.pairedTag=tagB
3. var ndefA=currpurchasedItems.getNDEFRecord( )
4. ndefA.mimeMediaRecord("text/json", JSON. stringify (tagA.toString));
5. ndefA.write( )
6.
7. tagA.pairedTag=tagB;
8. var ndefA=currpurchasedItems.getNDEFRecord( )
9. ndefA.mimeMediaRecord("text/json", JSON. stringify (tagA.toString));
10. ndefA.write( )
11.}
12.}
13. var tagA={
14. "productName":"ItemOne",
15. "price": 500,
16. "UPC":04212345678901,
17. "pairedTag": { }
18.}
19. var TagB={
20. "productName":"ItemOne",
21. "price": 500,
22. "UPC":04212345678901,
23. "pairedTag": { }
24.}
25. pairTags(tagA,tagB);

Then, at 306, the tag tampering detection program 108A, 108B may determine and register a distance between the paired tags on the item 204 (FIG. 2). Specifically, the tag tampering detection program 108A, 108B may determine a distance between the paired tags, Tag A and Tag B, using three-dimensional (3-D) RFID localization techniques. For example, the tag tampering detection program 108A, 108B may use a 3-D RFID localization technique that may include collecting and using received signal strength indicator (RSSI) data to determine the strength of RF signals associated with the pair of RFID tags (i.e. Tag A and Tag B) and determine strength distribution of RF signals between the RFID tags. Thereafter, the tag tampering detection program 108A, 108B may use an algorithm for 3-D localization based on the signal strength to track the RFID tags, Tag A and Tag B. Furthermore, the tag tampering detection program 108A, 108B may refine the location of the RFID tags on regions of the item 204 based on a condensation process that may include a geometric mean calculation. In turn, the tag tampering detection program 108A, 108B, may, for example, determine that Tag A has a distance of 1.0 inches from Tag B on item 204 (FIG. 2). Furthermore, the tag tampering detection program 108A, 108B may register the distance between Tag A and Tag B on a data storage device 106 that is associated with a client device 102, and/or on a database 116 that is associated with a server 112.

Next, at 308, the tag tampering detection program 108A, 108B may determine whether tag tampering occurs, whereby determining whether tag tampering occurs includes detecting whether at least one tag associated with the paired tags is displaced from another tag associated with the paired tags based on the registered distance between the paired tags. For example, and as previously described in FIG. 2, a customer may locate an item that is less expensive from the item 204 and thereby remove a tag from the less expensive item. The customer may also remove the Tag B on the item 204 and place the tag that is removed from the less expensive item on the item 204 in place of the Tag B in an attempt to pay less for the item 204. The customer may also remove the Tag A from the item 204 as well as place both Tag A and Tag B on the less expensive item or discard Tag A and Tag B altogether. As such, in response to the customer removing the tag from the less expensive item and/or removing the Tag B from the item 204, the tag tampering detection program 108A, 108B that may be embodied in a nearby client device 102 (FIG. 1) and/or server 112 (FIG. 1) may automatically detect in real-time that tag tampering has occurred. For example, the client device 102 (FIG. 1) may be a smart shelf, and/or a camera 210 that is located in between shelves and/or located atop the store venue 202, and the tag tampering detection program 108A, 108B may use the smart shelf and/or camera 210 to scan the item 204. Specifically, according to one embodiment, the tag tampering detection program 108A, 108B may scan the item 204 and detect that tag tampering has occurred by detecting that Tag B is not within the registered distance of Tag A on the item 204. More specifically, and as previously described, the tag tampering detection program 108A, 108B may register that Tag A and Tag B are specifically attached to the item 204, register that Tag A and Tag B are a pair, and register that the distance between Tag A and Tag B on the item 204 is 1.0 inches. Therefore, in response to a customer removing Tag B from the item 204, the tag tampering detection program 108A, 108B may determine that the distance between Tag A and Tag B that is based on the customer removing the Tag B from the item 204 does not match the registered distance of 1.0 inches between Tag A and Tag B, and/or that Tag B has surpassed a threshold distance with respect to the registered distance (for example, Tag B has been moved to a position greater than, or possibly even less than, 1.0 inches from Tag A). Similarly, the tag tampering detection program 108A, 108B may detect that tag tampering has occurred based on a discrepancy in the distance between the tags on the less expensive item in the same way it is detected on item 204.

According to one embodiment, the tag tampering detection program 108A, 108B may determine whether tag tampering has occurred using the following pseudocode to check the items in the store venue 202:
28. function checkPaired(checkMe) {
29. if (checkMe.PairedTag) {
30. return isAbnormal(getXYZ(checkMe), getXYZ(checkMe.pairedTag));
31.}
32. return True;
33.}
34. // on new tag read by a nearby reader
35. checkPaired(currentReadTag);

Next, at 310, in response to determining that tag tampering has occurred, the tag tampering detection program 108A, 108B may present an alert. For example, and as previously described in FIG. 2, in response to determining that tag tampering has occurred, the tag tampering detection program 108A, 108B may present an alert that may include using a camera 210 to take a picture of the customer suspected of tag tampering, sounding an alarm in the store venue 202, turning on a light in the aisle where the suspected tag tampering has occurred, and/or locking doors to the store venue 202 to prevent the suspected customer from escaping. The tag tampering detection program 108A, 108B may also use the client computer 102 and/or server 112 to send a message to store associates located within the store venue 202, whereby the message may include product information (such as item price and item weight) associated with the items in question (i.e. item 204 and the less expensive item) and tag data (such as which items are registered with the tags, and the current location of each of the tags) associated with the tags in question (i.e. Tag A and Tag B, and the tags associated with the less expensive item). The tag tampering detection program 108A, 108B may also determine where the tag tampering issue has occurred based on where the discrepancy in the distance between the tags is first detected (for example, the discrepancy may be first detected by a smart shelf in aisle 4). Furthermore, based on global positioning satellite (GPS) information associated with a mobile device that is attached to a store associate, the tag tampering detection program 108A, 108B may alert a nearby store associate that is closest to the suspected tampering location. According to one embodiment, the tag tampering detection program 108A, 108B may send the message and/or the alert to the mobile device attached to or associated with a store associate.

It may be appreciated that FIGS. 1-3 provide only illustrations of one implementation and does not imply any limitations with regard to how different embodiments may be implemented. Many modifications to the depicted environments may be made based on design and implementation requirements. For example, and as previously described in FIG. 2, the tag tampering detection program 108A, 108B may register additional information regarding the relationship between Tag A, Tag B, and the item 204, such as registering the weight of the item 204 and associating the weight of the item 204 with Tag A and Tag B. The tag tampering detection program 108A, 108B may also register additional information such as the price of the item 204, the name of the item 204, universal product codes (UPC) associated with the item 204, stock keeping unit (SKU) codes associated with the item 204, and/or quick response (QR) codes associated with the item 204. Thus, in response to the customer removing Tag A and Tag B from item 204 and placing them on the less expensive item, and/or in response to the customer removing one or all of the tags from the less expensive item and placing them on item 204, the tag tampering detection program 108A, 108B may additionally detect that tag tampering has occurred based on such information as the weight of the item 204 or the less expensive item not matching the registered weight that is associated with the tags that are attached to them. Furthermore, the tag tampering detection program 108A, 108B may detect whether tag tampering has occurred by using the client device 102 and/or the server 112 to scan areas of the store venue 202 (such as aisles, floors, shelves) to further locate tags associated with an item in the store venue 202.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
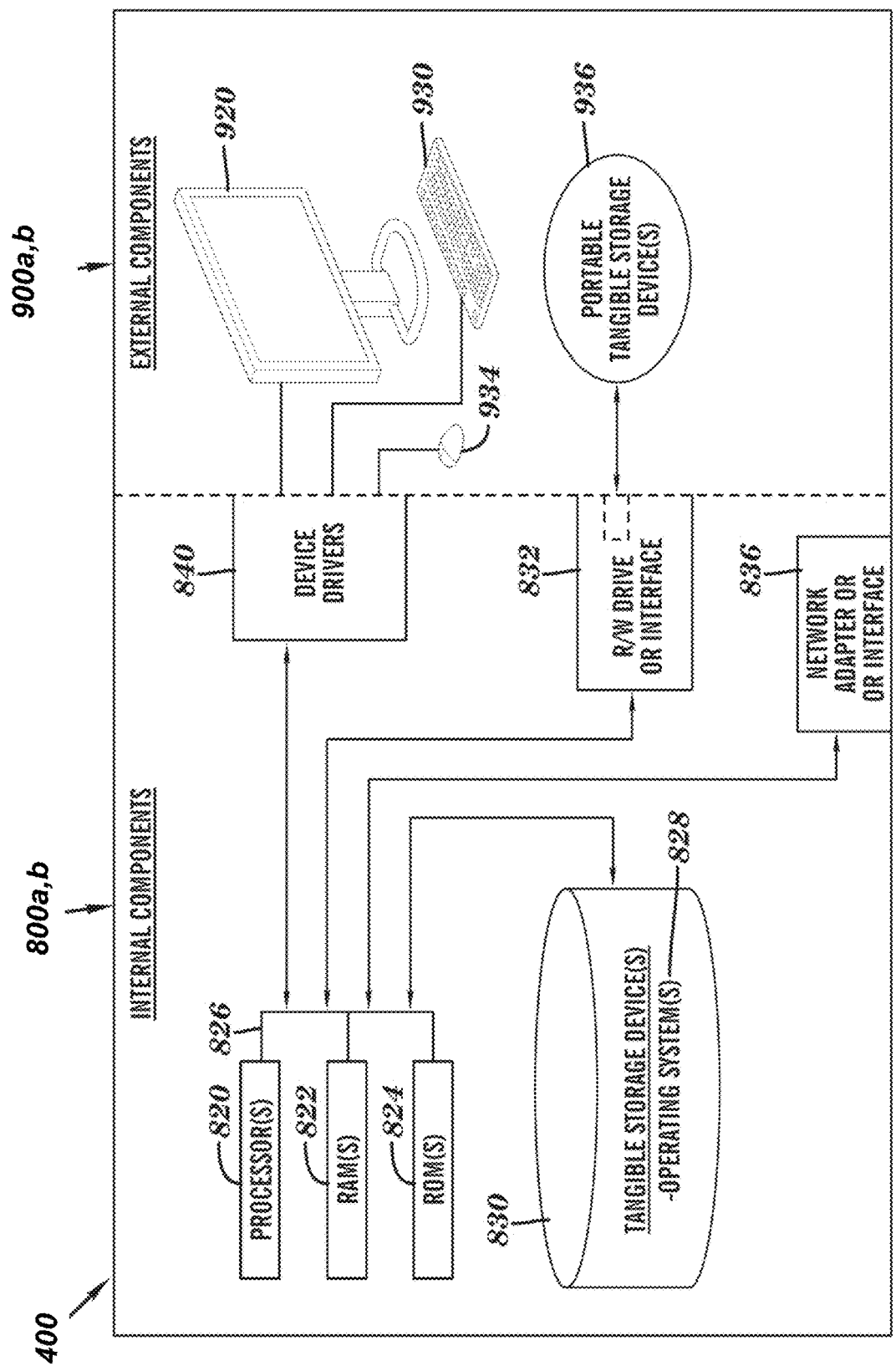
FIG. 4 is a block diagram of the system architecture of the program for detecting tag tampering on at least one item located in a store venue according to one embodiment.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 800 a, b and external components 900 a, b illustrated in FIG. 4. Each of the sets of internal components 800 a, b includes one or more processors 820, one or more computer-readable RAMs 822, and one or more computer-readable ROMs 824 on one or more buses 826, and one or more operating systems 828 and one or more computer-readable tangible storage devices 830. The one or more operating systems 828, the software program 114 (FIG. 1) and the tag tampering detection program 108A (FIG. 1) in client computer 102 (FIG. 1), and the tag tampering detection program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 *a, b*, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as a tag tampering detection program 108A and 108B (FIG. 1), can be stored on one or more of the respective portable computer-readable tangible storage devices 936, read via the respective R/W drive or interface 832, and loaded into the respective hard drive 830.

Each set of internal components 800 *a, b* also includes network adapters or interfaces 836 such as a TCP/IP adapter cards, wireless Wi-Fi interface cards, or 3G or 4G wireless interface cards or other wired or wireless communication links. The tag tampering detection program 108A (FIG. 1) and software program 114 (FIG. 1) in client computer 102 (FIG. 1), and the tag tampering detection program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the tag tampering detection program 108A (FIG. 1) and software program 114 (FIG. 1) in client computer 102 (FIG. 1) and the tag tampering detection program 108B (FIG. 1) in network server computer 112 (FIG. 1) are loaded into the respective hard drive 830. The network may comprise copper wires, optical fibers, wireless transmission, routers, firewalls, switches, gateway computers, and/or edge servers.

Each of the sets of external components 900 *a, b* can include a computer display monitor 920, a keyboard 930, and a computer mouse 934. External components 900 *a, b* can also include touch screens, virtual keyboards, touch pads, pointing devices, and other human interface devices. Each of the sets of internal components 800 *a, b* also includes device drivers 840 to interface to computer display monitor 920, keyboard 930, and computer mouse 934. The device drivers 840, R/W drive or interface 832, and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
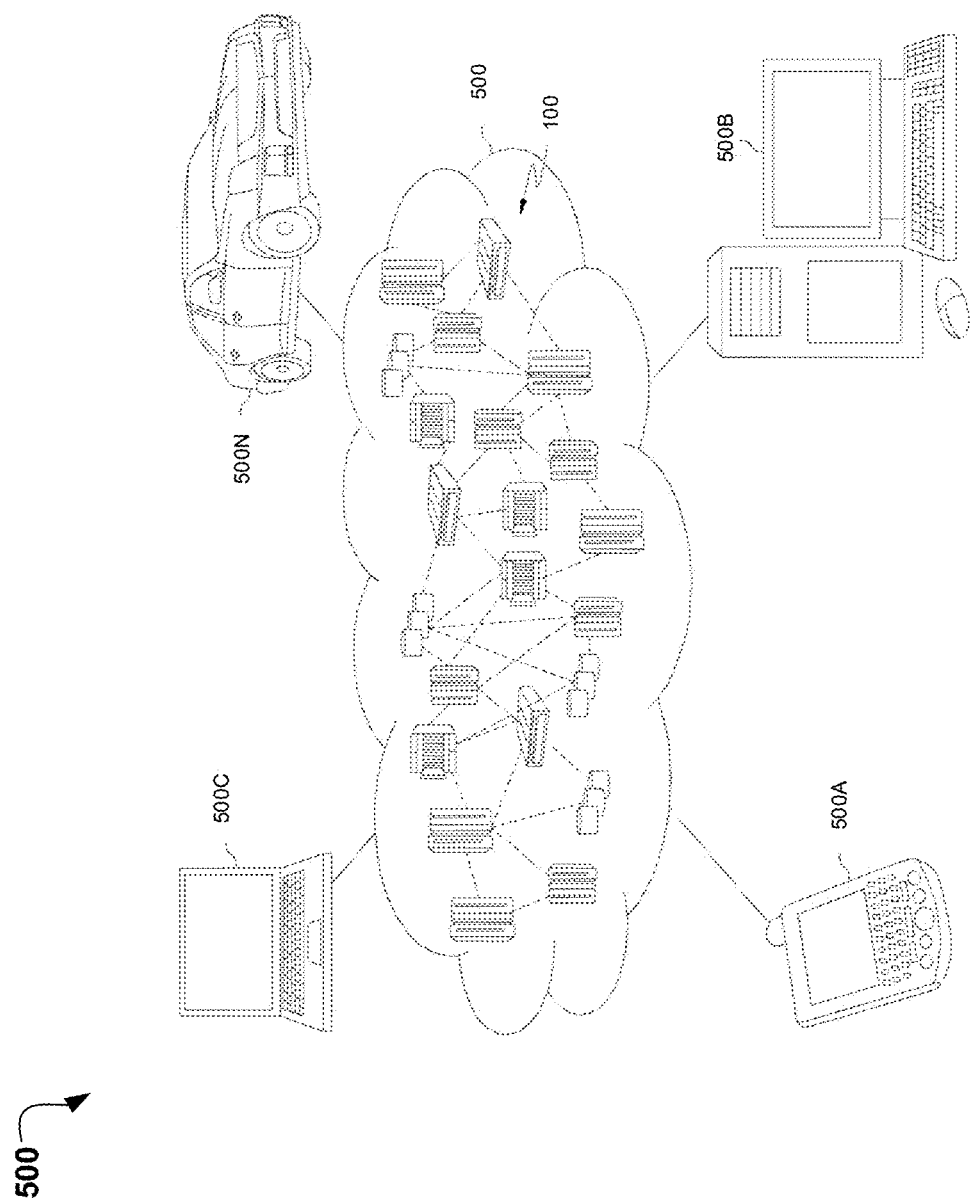
FIG. 5 is a block diagram of an illustrative cloud computing environment including the computer system depicted in FIG. 1, in accordance with an embodiment of the present disclosure.

Referring now to FIG. 5, illustrative cloud computing environment 500 is depicted. As shown, cloud computing environment 500 comprises one or more cloud computing nodes 100 with which local computing devices used by cloud consumers, such as, for example, personal digital assistant (PDA) or cellular telephone 500A, desktop computer 500B, laptop computer 500C, and/or automobile computer system 500N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 500A-N shown in FIG. 5 are intended to be illustrative only and that computing nodes 100 and cloud computing environment 500 can communicate with any type of computerized device over any type of network and/or network addressable connection (e.g., using a web browser).

Figure 6:
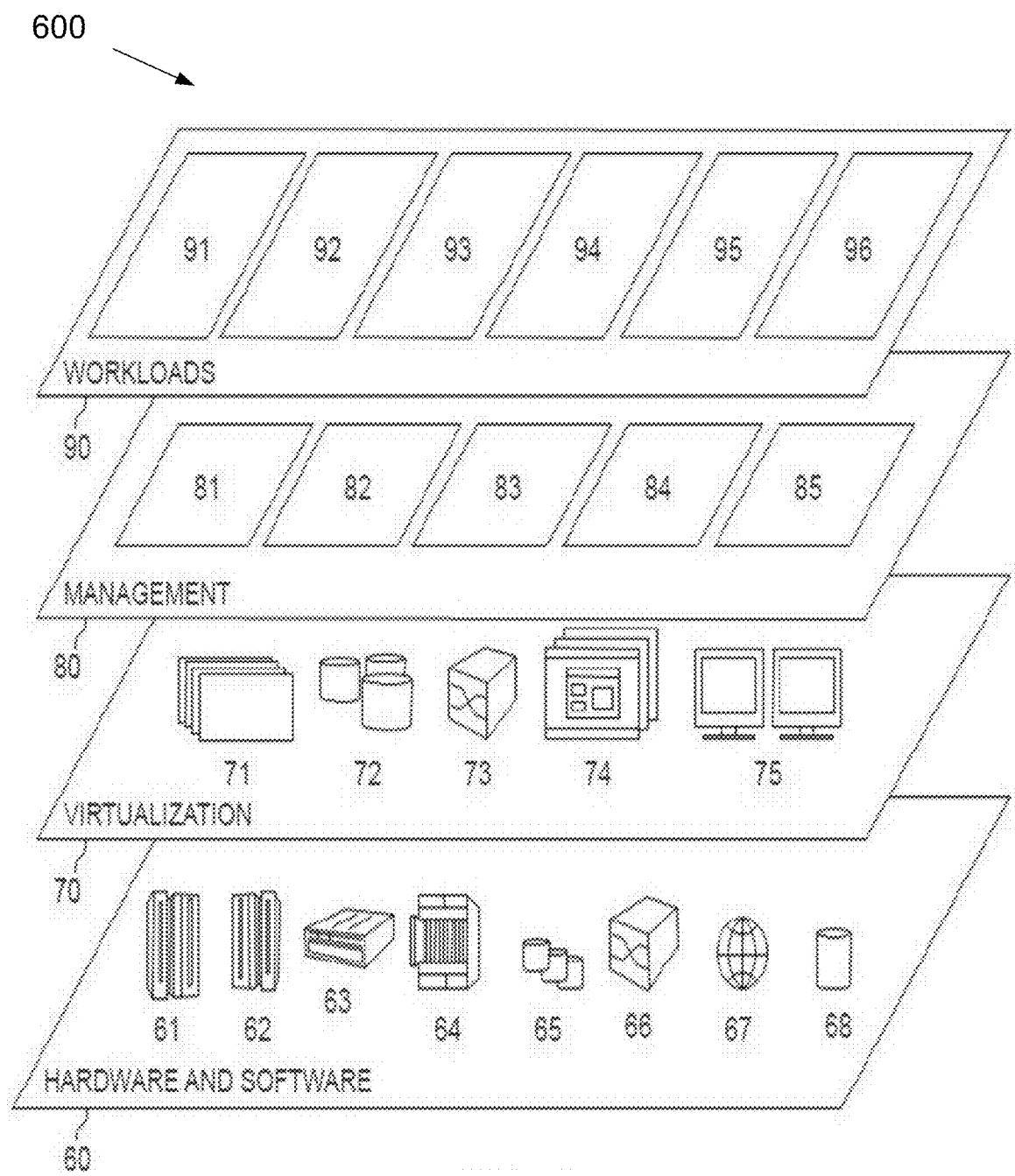
FIG. 6 is a block diagram of functional layers of the illustrative cloud computing environment of FIG. 5, in accordance with an embodiment of the present disclosure.

Referring now to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and tag tampering detection 96. A tag tampering detection program 108A, 108B (FIG. 1) may be offered "as a service in the cloud" (i.e., Software as a Service (SaaS)) for applications running on computing devices 102 (FIG. 1) and may detect tag tampering on at least one item located in a venue.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for detecting tag tampering on at least one item located in a venue, the method comprising:

registering, by a computer, a first tag and a second tag with the at least one item, wherein registering the first tag and the second tag comprises registering that the first tag and the second tag are specifically attached to or located on the at least one item and registering with the first tag and the second tag additional information associated with the at least one item;

pairing, by the computer, the first tag and the second tag that are registered with the at least one item;

determining and registering, by the computer, a distance between the first tag and the second tag on the at least one item; and detecting, by the computer, whether tag tampering occurs on the at least one item, whereby detecting whether tag tampering occurs comprises using at least one computing device to scan the at least one item and one or more areas of the venue to detect whether the first tag and the second tag are displaced from the registered distance between the first tag and the second tag associated with the at least one item and detecting the additional information associated with the at least one item.

2. The method of claim 1, wherein the first tag and the second tag are radio-frequency identification (RFID) tags.

3. The method of claim 1, wherein pairing the first tag and the second tag that are registered with the at least one item further comprises:

forming a group of tags that include the first tag and the second tag and optionally one or more other tags that are located on the at least one item.

4. The method of claim 1, wherein determining and registering a distance between the first tag and the second tag on the at least one item further comprises:

using three-dimensional (3-D) RFID localization to determine and track radio-frequency (RF) signal strengths associated the first tag and the second tag; and determining the location of the first tag and the second tag on the at least one item.

5. The method of claim 1, wherein the at least one computing device is selected from a group comprising at least one of a mobile device, an RFID reader, a Bluetooth reader, a camera, a smart shelf, and a smart shopping cart.

6. The method of claim 1, wherein registering the first tag and the second tag with the at least one item further comprises:
registering with the first tag and the second tag the additional information, wherein the additional information is selected from a group comprising at least one of a price associated with the at least one item, a name associated with the at least one item, a universal product code (UPC) associated with the at least one item, a stock keeping unit (SKU) code associated with the at least one item, and a quick response (QR) code associated with the at least one item.

7. The method of claim 1, further comprising:
presenting an alert in response to the determination that tag tampering has occurred, wherein the alert is selected from a group comprising at least one of taking a picture of a suspected customer, sounding an alarm in the venue, turning on a light where suspected tag tampering has occurred, locking doors to the venue to prevent the suspected customer from escaping, and sending a message to a device associated with a venue associate.

8. A computer system for detecting tag tampering on at least one item located in a venue, comprising:
one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
registering, by a computer, a first tag and a second tag with the at least one item, wherein registering the first tag and the second tag comprises registering that the first tag and the second tag are specifically attached to or located on the at least one item and registering with the first tag and the second tag additional information associated with the at least one item;
pairing, by the computer, the first tag and the second tag that are registered with the at least one item;
determining and registering, by the computer, a distance between the first tag and the second tag on the at least one item; and
detecting, by the computer, whether tag tampering occurs on the at least one item, whereby detecting whether tag tampering occurs comprises using at least one computing device to scan the at least one item and one or more areas of the venue to detect whether the first tag and the second tag are displaced from the registered distance between the first tag and the second tag associated with the at least one item and detecting the additional information associated with the at least one item.

9. The computer system of claim 8, wherein the first tag and the second tag are radio-frequency identification (RFID) tags.

10. The computer system of claim 8, wherein pairing the first tag and the second tag that are registered with the at least one item further comprises:
forming a group of tags that include the first tag and the second tag and optionally one or more other tags that are located on the at least one item.

11. The computer system of claim 8, wherein determining and registering a distance between the first tag and the second tag on the at least one item further comprises:
using three-dimensional (3-D) RFID localization to determine and track radio-frequency (RF) signal strengths associated the first tag and the second tag; and
determining the location of the first tag and the second tag on the at least one item.

12. The computer system of claim 8, wherein the at least one computing device is selected from a group comprising at least one of a mobile device, an RFID reader, a Bluetooth reader, a camera, a smart shelf, and a smart shopping cart.

13. The computer system of claim 8, wherein registering the first tag and the second tag with the at least one item further comprises:
registering with the first tag and the second tag the additional information, wherein the additional information is selected from a group comprising at least one of a price associated with the at least one item, a name associated with the at least one store item, a universal product code (UPC) associated with the at least one item, a stock keeping unit (SKU) code associated with the at least one item, and a quick response (QR) code associated with the at least one item.

14. The computer system of claim 8, further comprising:
presenting an alert in response to the determination that tag tampering has occurred, wherein the alert is selected from a group comprising at least one of taking a picture of a suspected customer, sounding an alarm in the store venue, turning on a light where suspected tag tampering has occurred, locking doors to the venue to prevent the suspected customer from escaping, and sending a message to a device associated with a venue associate.

15. A computer program product for detecting tag tampering on at least one item located in a venue, comprising:
one or more tangible computer-readable storage devices and program instructions stored on at least one of the one or more tangible computer-readable storage devices, the program instructions executable by a processor, the program instructions comprising:
program instructions to register a first tag and a second tag with the at least one item, wherein registering the first tag and the second tag comprises registering that the first tag and the second tag are specifically attached to or located on the at least one item and registering with the first tag and the second tag additional information associated with the at least one item;
program instructions to pair the first tag and the second tag that are registered with the at least one item;
program instructions to determine and register a distance between the first tag and the second tag on the at least one item; and
program instructions to detect whether tag tampering occurs on the at least one item, whereby detecting whether tag tampering occurs comprises using at least one computing device to scan the at least one item and one or more areas of the venue to detect whether the first tag and the second tag are displaced from the registered distance between the first tag and the second tag associated with the at least one item and detecting the additional information associated with the at least one item.

16. The computer program product of claim 15, wherein the first tag and the second tag are radio-frequency identification (RFID) tags.

17. The computer program product of claim 15, wherein the program instructions to determine and register a distance between the first tag and the second tag on the at least one item further comprises:
   program instructions to use three-dimensional (3-D) RFID localization to determine and track radio-frequency (RF) signal strengths associated the first tag and the second tag; and
   program instructions to determine the location of the first tag and the second tag on regions of the at least one item.

18. The computer program product of claim 15,
   wherein the at least one computing device is selected from a group comprising at least one of a mobile device, an RFID reader, a Bluetooth reader, a camera, a smart shelf, and a smart shopping cart.

19. The computer program product of claim 15, wherein the program instructions to register the first tag and the second tag with the at least one item further comprises:
   program instructions to register with the first tag and the second tag the additional information, wherein the additional information is selected from a group comprising at least one of a price associated with the at least one item, a name associated with the at least one item, a universal product code (UPC) associated with the at least one item, a stock keeping unit (SKU) code associated with the at least one item, and a quick response (QR) code associated with the at least one item.

20. The computer program product of claim 15, further comprising:
   program instructions to present an alert in response to the determination that tag tampering has occurred, wherein the alert is selected from a group comprising at least one of taking a picture of a suspected customer, sounding an alarm in the store venue, turning on a light where suspected tag tampering has occurred, locking doors to the venue to prevent the suspected customer from escaping, and sending a message to a device associated with a venue associate.

\* \* \* \* \*